Aug. 29, 1967 B. COHEN 3,339,186

SELECTIVELY WOUND ARRAY

Filed Aug. 29, 1962 5 Sheets-Sheet 1

INVENTOR.
BERTRAND COHEN
BY Henry L. Hanson
ATTORNEY

Aug. 29, 1967 B. COHEN 3,339,186

SELECTIVELY WOUND ARRAY

Filed Aug. 29, 1962 5 Sheets-Sheet 2

INVENTOR.
BERTRAND COHEN

BY Henry L. Hanson

ATTORNEY

INVENTOR.
BERTRAND COHEN
BY Henry L. Hanson
ATTORNEY

Aug. 29, 1967 B. COHEN 3,339,186

SELECTIVELY WOUND ARRAY

Filed Aug. 29, 1962 5 Sheets-Sheet 4

INVENTOR.
BERTRAND COHEN

BY Henry L. Hanson

ATTORNEY

Aug. 29, 1967 B. COHEN 3,339,186

SELECTIVELY WOUND ARRAY

Filed Aug. 29, 1962 5 Sheets-Sheet 5

INVENTOR.
BERTRAND COHEN

BY Henry L. Hanson

ATTORNEY 3,339,186
SELECTIVELY WOUND ARRAY
Bertrand Cohen, Watertown, Mass., assignor to Honeywell Inc., a corporation of Delaware
Filed Aug. 29, 1962, Ser. No. 220,199
13 Claims. (Cl. 340—174)

A general object of the present invention is to provide a new and improved electrical apparatus utilizing saturable magnetic cores in combination with a plurality of control and sense windings for effecting predetermined operations. More specifically, the present invention is concerned with a new and improved electrical apparatus employing a plurality of saturable magnetic cores in combination with a plurality of control and sense windings arranged with respect to the cores of the apparatus and with respect to each other so that there will be a minimal amount of noise and interference between the associated wires within the apparatus as the apparatus is operating.

In a copending application of Joseph J. Eachus bearing Ser. No. 843,515, filed Sept. 30, 1959, now Patent No. 3,157,862, there is disclosed a data processing system incorporating a magnetic core type sequencer and logical control circuit. The circuitry in this apparatus takes the form of a plurality of saturable magnetic cores arranged in a linear type array with a plurality of wires selectively threading the cores for control and sense purposes. In the embodiment disclosed in the aforesaid patent, the apparatus is arranged with at least one drive winding being provided for supplying a drive signal to each of the saturable cores of the combination. Thus, if any core is not saturated, the signal from a drive source on the drive winding coupled to the core will cause a change in flux condition in the non-saturated core. The change of flux will be appropriately sensed by another winding which is coupled to the core and to some external utilization circuit. Where a large number of cores is used in a configuration, such as is disclosed in the aforementioned Eachus patent, there are inherent limitations which restrict the ultimate size and application of the apparatus due to the presence of unwanted signals or noise in the interconnecting wires associated with the cores. As the presence of unwanted noise signals in such a circuit tends to detract from the other substantial advantages offered by the use of such circuits, it has been found desirable to provide a wiring arrangement which would minimize or substantially eliminate the effects of noise signals in the circuitry.

It is therefore a further more specific object of the present invention to provide a new and improved wiring arrangement for a plurality of saturable cores used in a logical or sequencing type circuit wherein the wiring is arranged to substantially eliminate the effects of noise signals resulting from the intercoupling of signals between the wires of the circuitry.

In a multiple core array such as will be found in the aforementioned Eachus patent, there are basically three types of noise or unwanted pickup that may be associated with the operation of the array. First, there is a noise which may be referred to as a capacitive noise which is generated external to the core array with insufficient shielding of the circuits associated with the array. A further type of noise may be associated with the individual saturable cores of the combination in that there is a certain amount of noise generated within the individual cores due to a switching action of the core which may be insufficient to cause any change of the bistable state of the core, yet sufficient to generate a noise signal in any wire threading the core. A further type of noise that is the most troublesome and difficult to eliminate in a large array of cores having many input, control and sense windings, is induction noise which takes the form of unwanted signals generated within the array due to the proximity of the control and output wires.

In a preferred embodiment of the invention, the saturable magnetic cores were arranged in a rectangular array with a plurality of adjacent rows of cores. A large number of windings was used in connection with driving, suppressing or inhibiting, and sensing the operation of the cores in the circuitry. These windings were selectively threaded through the array in such a manner that the inductive coupling between the wires associated with certain ones of the different functions was substantially eliminated. Thus, the cores in the array were so positioned that the windings for each control or sensing function were associated with each row of cores and positioned adjacent to the same functional windings used in the immediately adjacent row so as to eliminate the adverse noise due to inductive coupling inherent in running a plurality of wires adjacent to each other.

It is then another more specific object of the invention to provide a new and improved electrical apparatus employing a plurality of magnetic cores arranged in a rectangular array with the cores within the array being positioned in a plurality of adjacent rows and wherein the windings associated with these cores for control and sensing purposes are uniquely arranged with respect to each row so that each particular function, represented by control or sense windings, is adjacent to the same function in the next adjacent row, so as to minimize the coupling between the windings associated with certain ones of the different circuit functions.

Still another more specific object of the present invention is to provide a new and improved electrical apparatus incorporating a plurality of saturable magnetic cores arranged in a rectangular array wherein the array has a plurality of adjacent rows of cores in combination with control and sense windings associated with the cores with said windings being so arranged that the control windings are associated with one side of each row of cores and the sense windings are associated with the side opposite said one side in each row of cores.

Still a further more specific object of the present invention is to provide a new and improved electrical apparatus utilizing saturable magnetic cores in combination with a plurality of control and sense windings, said control windings arranged in such a manner as to restrict any external field generated by these windings to current loop areas and to isolate the sense windings from these areas.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
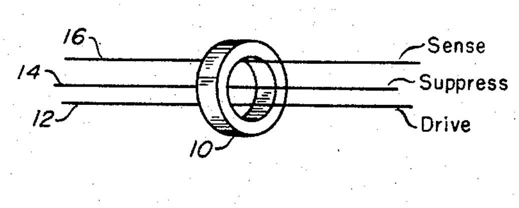
FIGURE 1 illustrates a basic circuit used in electrical apparatus incorporating the principles of the present invention.

Referring first to FIGURE 1, the numeral 10 identifies a saturable magnetic core element of the cylindrical type which is adapted to be selectively threaded by a plurality of wires. Each wire comprises a single-turn winding as it passes through the core. The first wire threading the core 10 is a wire 12 which may be identified as a drive winding and which, in the absence of a saturated condition within the core, is capable of causing a flux change within the core. A second wire associated with the core 10 is a wire 14 which is here referred to as a suppress or inhibit winding. This winding may be utilized for purposes of applying a bias signal to the core to hold it in a predetermined saturated state and thereby prevent the drive signal on the winding 12 from causing any change in the flux within the core when the drive signal is operating. A still further wire 16 threads the core 10, and this wire is referred to as a sense winding. This sense winding is coupled to the core to sense when the core 10 is being switched by a drive signal on the winding 12. As shown in the aforementioned Eachus patent, the basic circuit configuration set forth in FIGURE 1 may be expanded to provide a complex logical or sequencing type circuit in accordance with a multiplicity of drive and control signals applied to the cores in an array.

Figure 2:
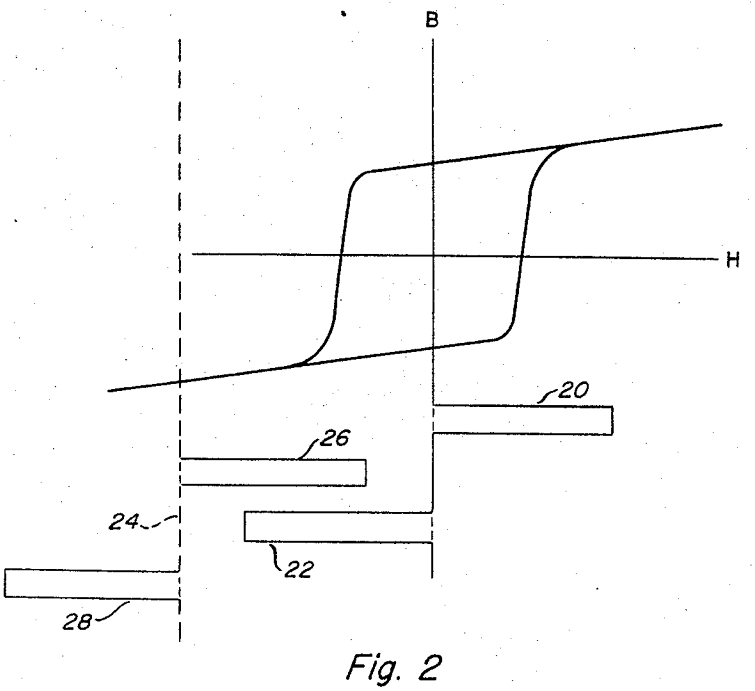
FIGURE 2 illustrates the operating characteristics of a saturable core element usable in the present invention.

As will be apparent to those skilled in the art, the rectangular hysteresis characteristic illustrated in FIGURE 2 is the type of characteristic that is normally associated with bistable magnetic cores such as the core 10 shown in FIGURE 1. The B–H characteristic is such that when there is a drive signal applied to the core, in the absence of any external bias, said signal being represented by the pulse signal 20, the core will switch in accordance with its characteristic curve and the resultant change in flux will be appropriately detected by way of a signal being generated in the sense winding threading the core. A redrive signal 22 may be applied to the winding 12 or to a separate redrive winding to switch the core back to its initial state.

In the event that a suppress signal or inhibit signal is applied to the suppress winding 14 to bias the core to a value represented by the line 24, the presence of a drive signal 26 superimposed on this bias line will be insufficient to cause the core to switch throughout its entire characteristic. However, the application of the drive signal 26 will cause the core to pass through a partial switching which will introduce a relatively small signal within the sense winding as the drive or redrive signal 26 and 28 is applied to the core.

It will be noted in the single wiring arrangement shown in FIGURE 1 that the drive, suppress and sense windings all run parallel to each other. This will result in inductive signal coupling between the windings which, when extended to a core array embodying a large number of cores, can create adverse noise conditions that must be eliminated if the circuitry is to be usable at high speeds.

Figure 3:
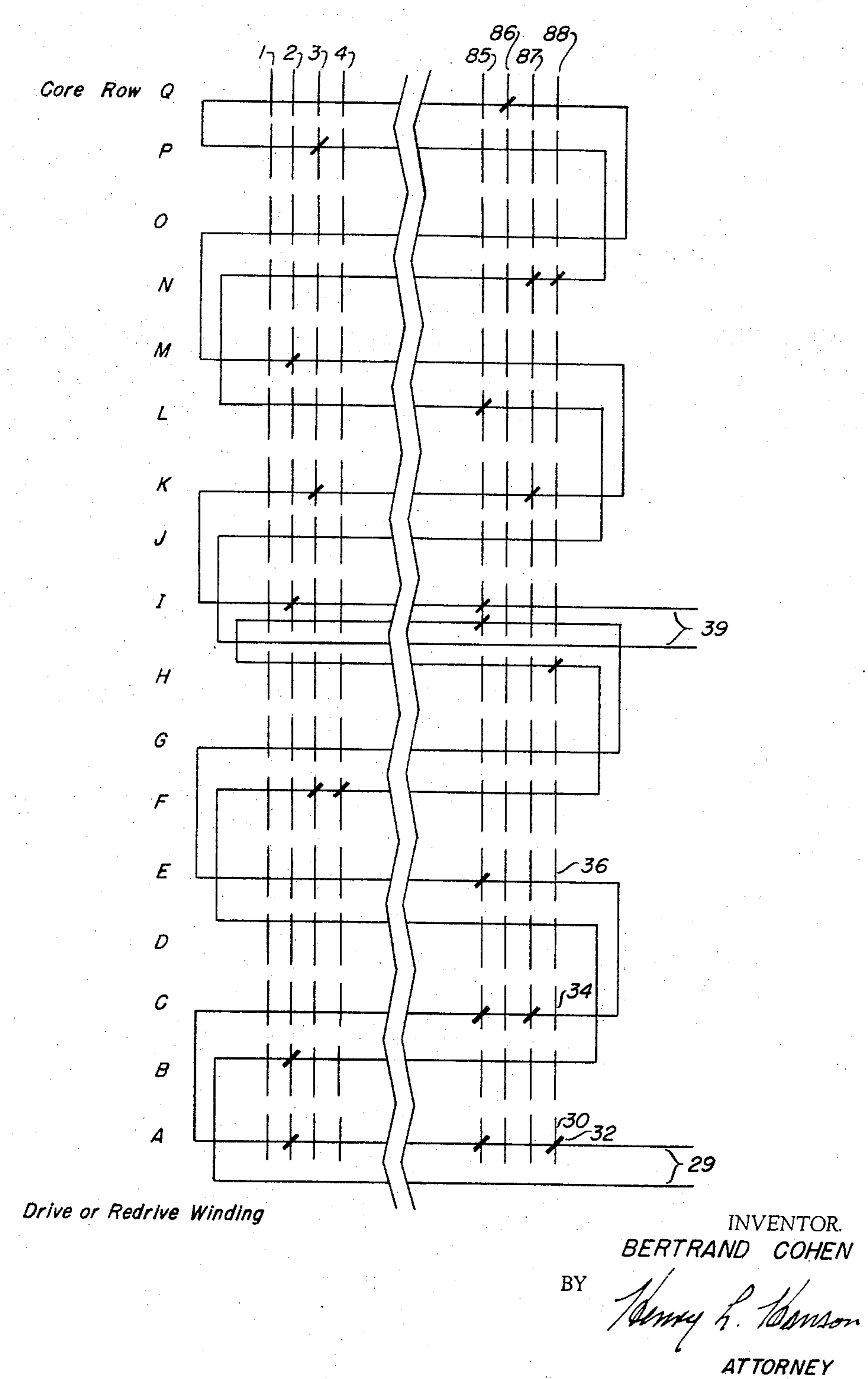
FIGURE 3 illustrates an array of saturable magnetic cores having a representative drive or redrive winding associated therewith.

Referring next to FIGURE 3, there is here illustrated an array of magnetic cores arranged in a rectangular fashion. As illustrated, there are a series of rows of cores identified by the letters A through Q. In addition, in each row, it is assumed that there are 88 cores and these cores are identified by the column indicators at the top of the figure and carrying numbers 1 through 4 and 85 through

88. A break line between the numbered columns of the combination signifies those cores between cores 4 and 85. A representative type of drive or redrive winding is shown associated with the cores of the array. The single winding illustrated is shown to be entering the array at one corner thereof at a core 30 in row A. The winding is considered to be coupled to any core at the intersection of the core illustrated if there is a diagonal line intersecting this crossover. Thus, the drive winding is shown to be electrically coupled to the core 30 by the diagonal line 32.

As the winding passes along the first row A, it is consistently positioned along one side of the row as it passes along the row regardless of whether it threads or bypasses the individual cores making up the row. As the winding leaves the first row A at the end core thereof, it then passes to the end core in row C. The winding then proceeds along that side of row C which is closest to row A and is selectively coupled to the individual cores in the row in accordance with a prearranged scheme. When the winding leaves the first core 34 in row C, it then passes to the fifth row E and enters by the first core 36 and passes again on the side of this row which is closest to row C. This forward threading of the winding through the array continues in the arrangement illustrated until the row I has been threaded at which time the drive winding reverses its general direction and returns through the array on the even-numbered rows of cores identified as H, F, D and B. It will be noted that the drive winding passes through or on the side of row H adjacent to row I and the same applies to each of the other even-numbered rows of cores.

As pointed out above, each winding consists of a forward and reverse pass through the array. Further, that section of each drive wire associated with each core row threaded in a forward direction is immediately adjacent to a section of that drive wire associated with each core row threaded in a reverse direction.

It will also be apparent that this particular configuration forms a current loop with the wires thereof being substantially adjacent to each other. The resultant current loop is one which has any resultant field generated by a drive or redrive signal restricted to the areas that are actually between the adjacent forward and reverse passes of each winding. Because of the restricted nature of this current loop, it will be readily apparent that the areas which are outside of the current loop are relatively free of any fields from the drive windings.

As illustrated in FIGURE 3, the cores in rows I through Q are associated with a different drive or redrive winding 39. This particular drive winding is associated with its respective rows of cores in the same manner as the winding 29 is associated with the rows of cores A through I. By separating the drive winding in this manner, it is possible to drive only a part of the array at any one time to thereby minimize the effects of this winding as a potential noise source. As illustrated, row I is associated with drive windings 29 and 39. This is a matter of design and is permissible so long as the basic wiring techniques covered herein are followed.

Figure 4:
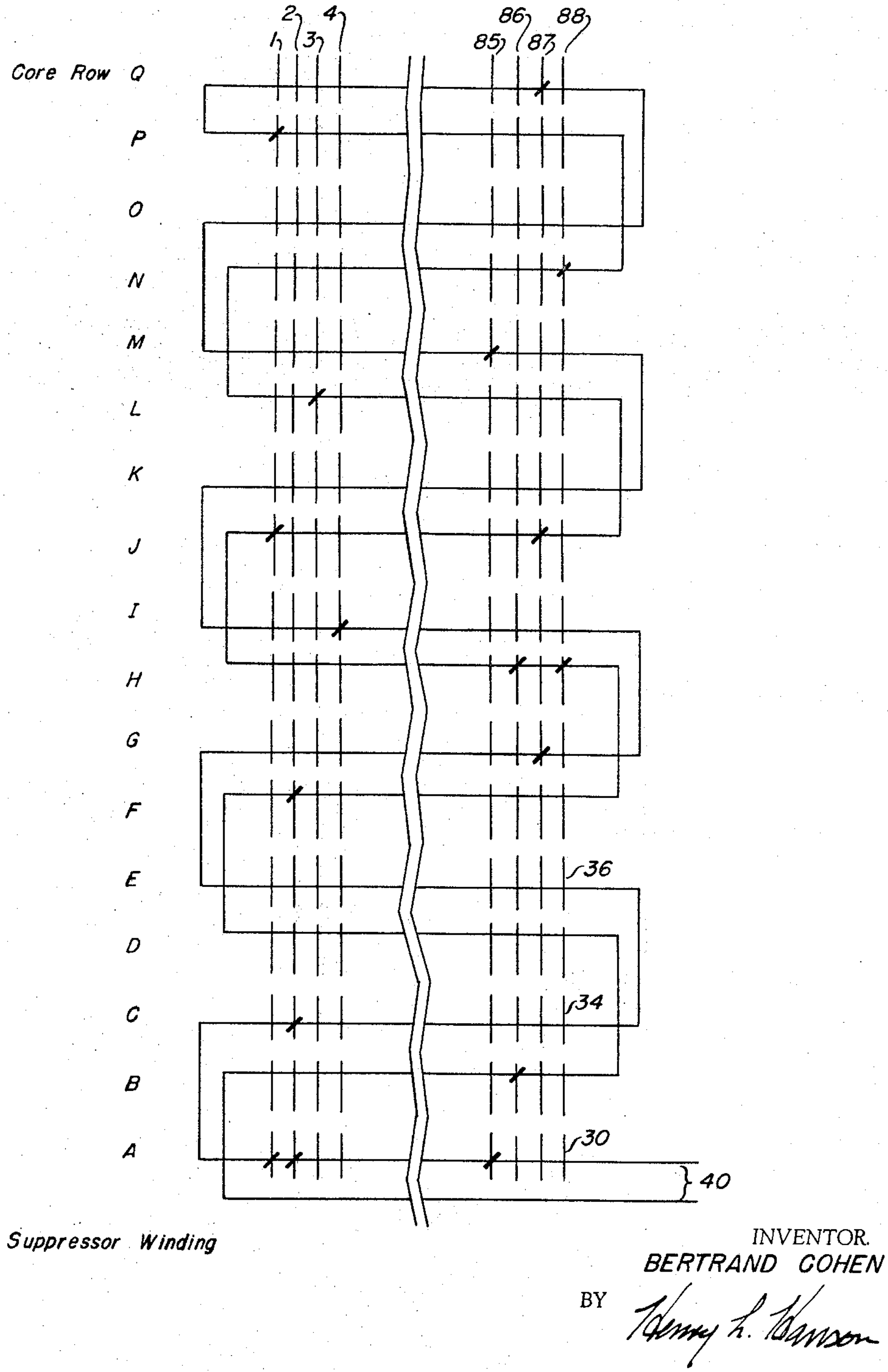
FIGURE 4 illustrates a rectangular array of saturable magnetic cores with a representative suppress winding associated with the cores.

Referring next to FIGURE 4, there is here illustrated a single suppressor or inhibit winding 40 which is representative of a number of such windings that may be associated with the core array. The core array is identified in the same manner as it is in FIGURE 3. It will be noted that the forward threading of the suppressor winding through the array starts at the lower right-hand corner of the array at the first core 30 in row A and passes through that row and is selectively coupled to predetermined cores in the row whereupon it exits from that row and then passes to the third row C where it enters at the end row and passes on through and exits from the array at the first core 34 in the row C. This winding arrangement then continues and enters the fifth row E at core 36 and extends along that row to exit the array and then comes back again in the next odd-numbered core row G. This wiring scheme extends throughout the array until such time as the row Q has been threaded. The wiring is then passed back through the array along the even-numbered rows identified in sequence by the letters P, N, L, J, H, F, D and B. The winding then exits from the array alongside of the first row immediately adjacent to the input portion of the winding.

It will be noted from the wiring arrangement illustrated in FIGURE 4 that the suppressor winding 40 follows the same general path as the drive winding illustrated in FIGURE 3. It will also be noted that this suppressor winding forms many closed current loops which comprise pairs of adjacent wires which tend to restrict the field generated by any suppressor winding to the current loops. Consequently, any areas of the core array which are external to these loops are substantially free of any field generated by the suppressor winding. It therefore becomes practical to arrange the suppressor windings and the drive windings along the same general path as they are passed through the array. This arrangement maintains the fields generated by the suppressor or drive winding in substantially the same areas where they will be relatively restricted, and the areas external to the current loops, formed by these windings, may then be used for positioning the sense windings in the manner illustrated in FIGURE 5.

Figure 5:
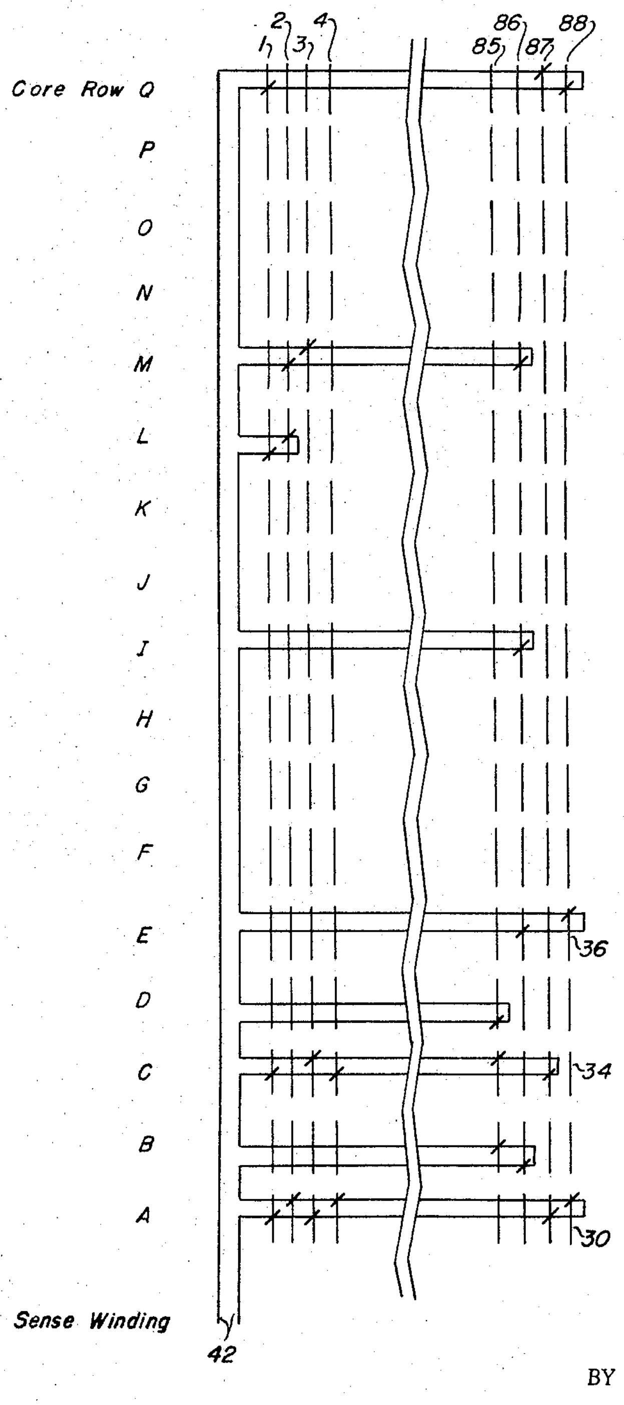
FIGURE 5 illustrates a rectangular array of cores having a representative sense winding associated therewith.

Referring next to FIGURE 5, the core array here illustrated corresponds to the array shown in FIGURES 3 and 4. In this particular figure a single sense winding 42 is illustrated which is representative of a number of sense windings that may be associated with the various rows of cores in the array. The winding 42 associated with the array will be seen to pass along the left-hand side of the array. At selected locations, the sense winding passes down along a row of cores and then returns along the same row. The length of each loop along a row is determined by the relative positioning within the row of the cores requiring threading. Thus, the sense winding in row A extends along the entire length of the row to the core 30 where it then comes back along the row. The cores coupled to the winding as it passes down and back along each row are balanced in number on each pass to the extent that this is possible. The sense winding associated with each row will be seen to pass down the particular row with which it is associated on the side opposite that related to the drive winding and suppress winding. Thus, the sense winding in any particular row is located out of the area generally affected by any fields generated by the suppress and drive windings. It will be noted that with respect to core row B, the sense wire is positioned on that side which is adjacent to core row A out of fields generated by the drive and suppressor windings.

The wiring of additional sense windings in the array will be in accordance with the general scheme outlined in FIGURE 5 with each sense winding selectively threading particular cores in predetermined rows in accordance with some prearranged scheme.

Figure 6:
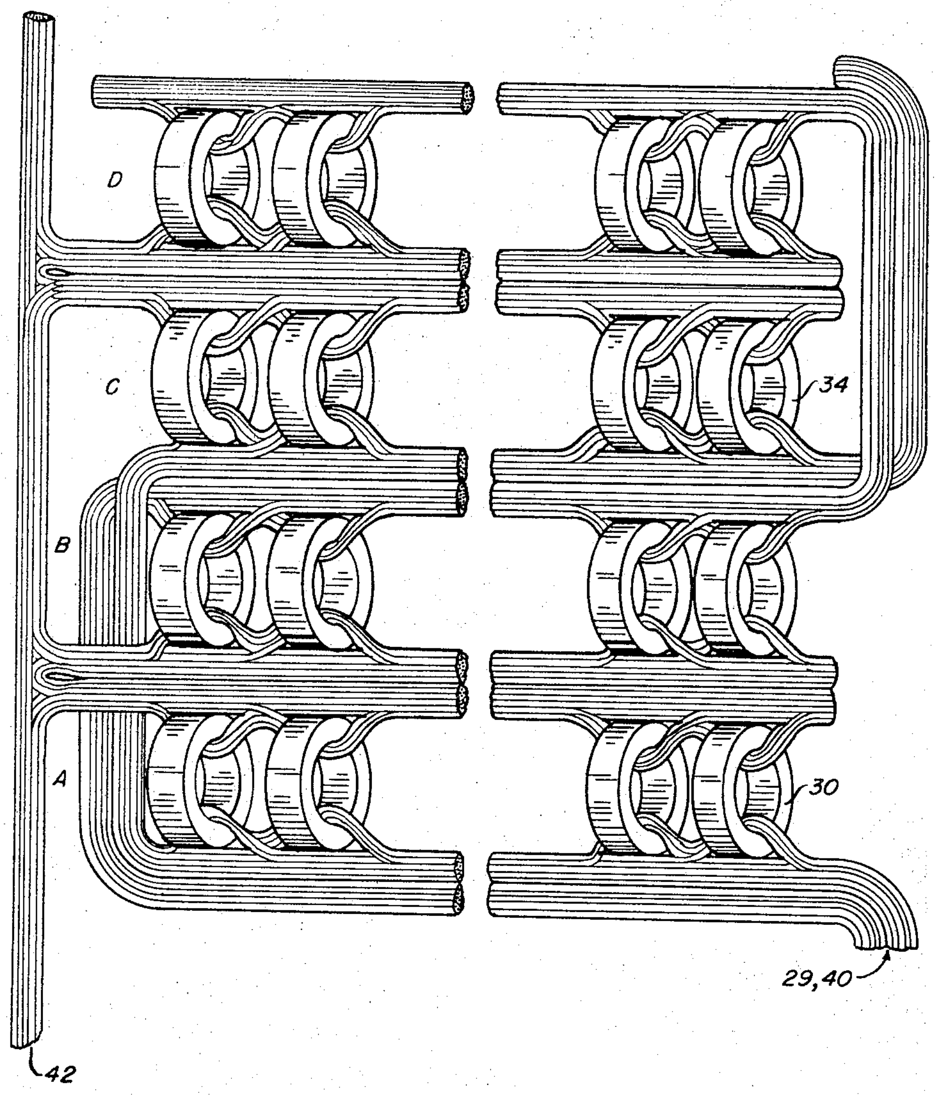
FIGURE 6 illustrates an assembled portion of a core array indicating a multiplicity of wires bundled together and associated with the control and sense functions of the over-all apparatus.

A portion of an entire assembly is illustrated in FIGURE 6 with only a part of the array illustrated in FIGURES 3 through 5 shown. In this particular figure there are four partial rows of cores shown for rows A, B, C and D. The drive, redrive and suppressor windings 29 and 40 are shown bundled together with these windings passing along the general path outlined above in the discussion of FIGURES 3 and 4. The windings enter and return in their path through the array immediately adjacent to each other and on adjacent sides or the rows of cores. The figure also illustrates the manner in which the sense windings 42 are bundled together on one side of the array and a portion of these sense wires pass down and back along the core rows in the spaces between the adjacent areas spanned by the drive, redrive and suppress windings. This further shows that the bundled sense wires on adjacent rows of cores are immediately adjacent to each other.

In one particular embodiment of the invention, employing approximately 1,500 cores each of which had at least one drive, sense, and suppress winding associated therewith, it was found that the speed of operation of the resultant electrical apparatus in terms of the ability to switch the core array without error at predetermined rates was enhanced by a factor of four over prior known wiring schemes. This substantial increase in operational speed was a direct result realizable only because of the improved signal-to-noise ratios achieved using the wiring scheme set forth herein.

While, in accordance with the provisions of the statutes, there has been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure Letters Patent is:

1. In an electrical controller, the combination comprising a plurality of saturable magnetic cores arranged in a plurality of adjacent odd and even rows, each of said rows having first and second opposite sides, a core drive winding coupled to selected ones of said cores to switch any core not saturated, said drive winding having serially-connected row segments, each of said segments passing through or along the cores of an even row on said first side of said even row, or passing through or along the cores of an odd row on said second side of said odd row adjacent to said first side of a proximate even row, and means coupled to said cores to selectively saturate predetermined ones of said cores.

2. In an electrical apparatus, the combination comprising a plurality of saturable magnetic cores arranged in a plurality of adjacent rows, each of said rows having first and second opposite sides, a core drive winding coupled to selected ones of said cores to switch any core not saturated, said drive winding having serially-connected row segments, each of said segments passing through or along the cores of an even row on said first side of said even row, or passing through or along the cores of an odd row on said second side of said odd row adjacent to said first side of a proximate even row, and means coupled to said cores to selectively saturate predetermined ones of said cores, said last-named means comprising a plurality of winding means coupled to or passing adjacent to said cores on the same side of each row as said drive winding.

3. Electrical apparatus comprising a plurality of saturable magnetic cores arranged in a plurality of adjacent rows, each of said rows having first and second opposite sides, a core drive winding coupled to selected ones of said cores to switch any core not saturated, said drive winding having serially-connected row segments, each of said segments passing through or along the cores of an even row on said first side of said even row, or passing through or along the cores of an odd row on said second side of said odd row adjacent to said first side of a proximate even row, means coupled to said cores to selectively saturable predetermined ones of said cores, and sense winding means selectively coupled to said cores on a side of each row opposite that associated with said drive winding.

4. Electrical apparatus comprising a plurality of saturable magnetic cores arranged in a plurality of adjacent rows, each of said rows having first and second opposite sides, drive means coupled to said cores to switch any core not in a saturated state, and a plurality of sense windings coupled to selected ones of said cores to sense any core switched by said drive means, each of said sense windings including serially-connected row segments, each of said segments passing down and back along an odd row of cores with which it is associated on said first side of said odd row, or passing down and back along an even row of cores with which it is associated on said second side of said even row adjacent to said first side of a proximate odd row.

5. In combination, a plurality of saturable magnetic cores arranged in a succession of adjacent rows, each of said rows having first and second opposite sides, drive means coupled to said cores to switch any core not in a saturated state, and a plurality of sense windings coupled to selected ones of said cores to sense any core switched by said drive means, each of said sense windings including serially-connected row segments, each of said segments passing down and back along an odd row of cores with which it is associated on said first side of said odd row, or passing down and back along an even row of cores with which it is associated on said second side of said even row adjacent said first side of a proximate odd row so that said sense windings on alternate pairs of adjacent rows of cores are adjacent to each other.

6. In combination, a plurality of saturable magnetic cores arranged in a plurality of adjacent rows, each of said rows having first and second opposite sides, drive means coupled to said cores to switch any core not in a saturated state, a plurality of sense windings coupled to selected ones of said cores to sense any core switched by said drive means, each of said sense windings comprising a lead passing down and back along each odd row of cores with which it is associated on a first side of said odd row and down and back along each even row of cores with which it is associated on a second side of said even row adjacent to said first side of a proximate odd row, and a plurality of suppress windings selectively coupled to said cores in each row, said suppress windings being positioned on a side of each row opposite that associated with said sense windings.

7. Electrical apparatus comprising a plurality of saturable magnetic cores arranged in a rectangular array by way of a plurality of adjacent rows of cores, drive winding means for switching selected non-saturated cores in said array, said drive winding means comprising a plurality of drive wires selectively coupled to predetermined ones of said cores and being bundled together and entering said array adjacent to the first core in the first row of said array, passing along said first row to the end core therein and proceeding to the end core in the third row in said array and then along said third row to the first core in said third row and continuing in like manner for a selected number of odd-numbered rows in said array, said drive wires being further positioned in said array so that the drive wires return through said array along the even-numbered rows in said array immediately adjacent said drive wires associated with said odd-numbered rows.

8. Electrical apparatus comprising a plurality of saturable magnetic cores arranged in a rectangular array by way of a plurality of adjacent rows of cores, suppress winding means comprising a plurality of suppress wires selectively coupled to predetermined ones of said cores, and drive winding means for switching selected non-saturated cores in said array, said drive winding means comprising a plurality of drive wires selectively coupled to predetermined ones of said cores and being bundled together with said suppress wires so that said drive wires and said suppress wires enter said array adjacent to the first core in the first row of said array, passing along said first row to the end core therein along one side thereof and proceeding to the end core in the third row in said array and then along said third row on the same side as said first row to the first core in said third row and continuing in like manner for a selected number of odd-numbered rows in said array, said drive wires and suppress wires being further positioned in said array so that the drive wires and suppress wires return through said array along the even-numbered rows in said array immediately adjacent to the side of said drive wires and suppress wires associated with said odd-numbered rows.

9. Electrical apparatus comprising a plurality of saturable magnetic cores arranged in a rectangular array by way of a plurality of adjacent rows of cores, each of said rows having first and second opposite sides, drive winding means for switching selected non-saturated cores in said array, saturation control means selectively coupled to said cores to control the saturation thereof, and sense means coupled to said cores to produce an output signal when any core not saturated is switched by said drive winding means, said sense means comprising a plurality of sense wires bundled together as a cable and passing along one end of said array, each of said sense wires having serially-connected wire segments, each of said wires being associated with selected ones of said core rows in a manner whereby each constituent wire segment passes from said cable along and back on said first side of a single odd-numbered row, or along and back on said second side of a single even-numbered row adjacent said last-recited first side.

10. Electrical apparatus comprising a plurality of saturable core arranged in a rectangular array by way of a plurality of adjacent rows of cores, suppress winding means comprising a plurality of suppress wires selectively coupled to predetermined ones of said cores, drive winding means for switching selected non-saturated cores in said array, said drive winding means comprising a plurality of drive wires selectively coupled to predetermined ones of said cores and being bundled together with said suppress wires so that said drive wires and said suppress wires enter said array adjacent to the first core in the first row of said array, passing along said first row to the end core therein along one side thereof and proceeding to the end core in the third row in said array and then along said third row on the same side as said first row to the first core in said third row and continuing in like manner for a selected number of odd-numbered rows in said array, said drive wires and suppress wires being further positioned in said array so that the drive wires and suppress wires return through said array along the even-numbered rows in said array immediately adjacent to the side of said drive wires and suppress wires associated with said odd-numbered rows, and sense means coupled to said cores to produce an output signal when any core not saturated is switched by said drive winding means, said sense means comprising a plurality of sense wires bundled together as a cable and passing along one end of said array with selected ones of said wires passing from said cable along and back on one side of the odd-numbered rows of cores and along and back on a side adjacent to said one side of the even-numbered rows of cores.

11. Apparatus as defined in claim 10 wherein said sense wires in each row of cores are on a side opposite the side associated with said drive and suppress wires.

12. An electrical apparatus comprising a plurality of saturable magnetic cores arranged in a succession of rows, each of said rows having first and second opposite sides, first winding means coupled to said plurality of cores to apply a saturation-changing signal to selected ones of said cores, and a saturation control means selectively coupled to said cores to control the saturated state of said cores in accordance with a predetermined pattern, said control means comprising apluralty of windings each coupled to less than the total number of said cores, each of said windings having serially-connected row segments which pass through or along the cores in an odd row on said first side of said odd row, or pass through or along the cores in an even row on said second side of said even row, so that said last-recited windings are adjacent to each other as they pass along alternate pairs of said rows of cores.

13. Electrical apparatus comprising a plurality of magnetic cores arranged in a rectangular array by way of a plurality of adjacent rows of cores, drive winding means for switching said cores in said array, said drive winding means entering said array adjacent to the first core in the first row of said array, passing along said first row to the end core therein along one side thereof and proceeding to the end core in the third row in said array and then along said third row on the same side as said first row to the first core in said third row and continuing in like manner for a selected number of odd-numbered rows in said array, said drive means being further positioned in said array so that the drive means returns through said array along the even-numbered rows in said array immediately adjacent to the side of said drive means associated with said odd-numbered rows, and a sense winding means passing along each row of said array on the side opposite the side associated with said drive winding means.

References Cited

UNITED STATES PATENTS

| | | | |
|---|---|---|---|
| 2,897,482 | 7/1959 | Rosenberg | 340—174 |
| 2,926,342 | 2/1960 | Rogers | 340—174 |
| 3,206,734 | 9/1965 | Briggs | 340—174 |
| 3,214,745 | 10/1965 | Eiseman | 340—174 |
| 3,218,614 | 11/1965 | Kilburn | 340—174 |

BERNARD KONICK, *Primary Examiner.*

M. S. GITTES, *Assistant Examiner.*

UNITED STATES PATENT OFFICE
CERTIFICATE OF CORRECTION

Patent No. 3,339,186 August 29, 1967

Bertrand Cohen

It is certified that error appears in the above identified patent and that said Letters Patent are hereby corrected as shown below:

Column 6, line 64, "saturable" should read -- saturate --. Column 8, line 23, "saturable core arranged" should read -- saturable magnetic cores arranged --.

Signed and sealed this 10th day of March 1970.

(SEAL)
Attest:

Edward M. Fletcher, Jr.
Attesting Officer

WILLIAM E. SCHUYLER, JR.
Commissioner of Patents